No. 837,348. PATENTED DEC. 4, 1906.
H. S. SMITH.
WHEELED PLOW.
APPLICATION FILED JUNE 21, 1906.

3 SHEETS—SHEET 1.

Witnesses
Inventor
H. S. Smith.
By James J Sheehy
J. J. Sheehy Jr.
Attorney

No. 837,348. PATENTED DEC. 4, 1906.
H. S. SMITH.
WHEELED PLOW.
APPLICATION FILED JUNE 21, 1906.
3 SHEETS—SHEET 2
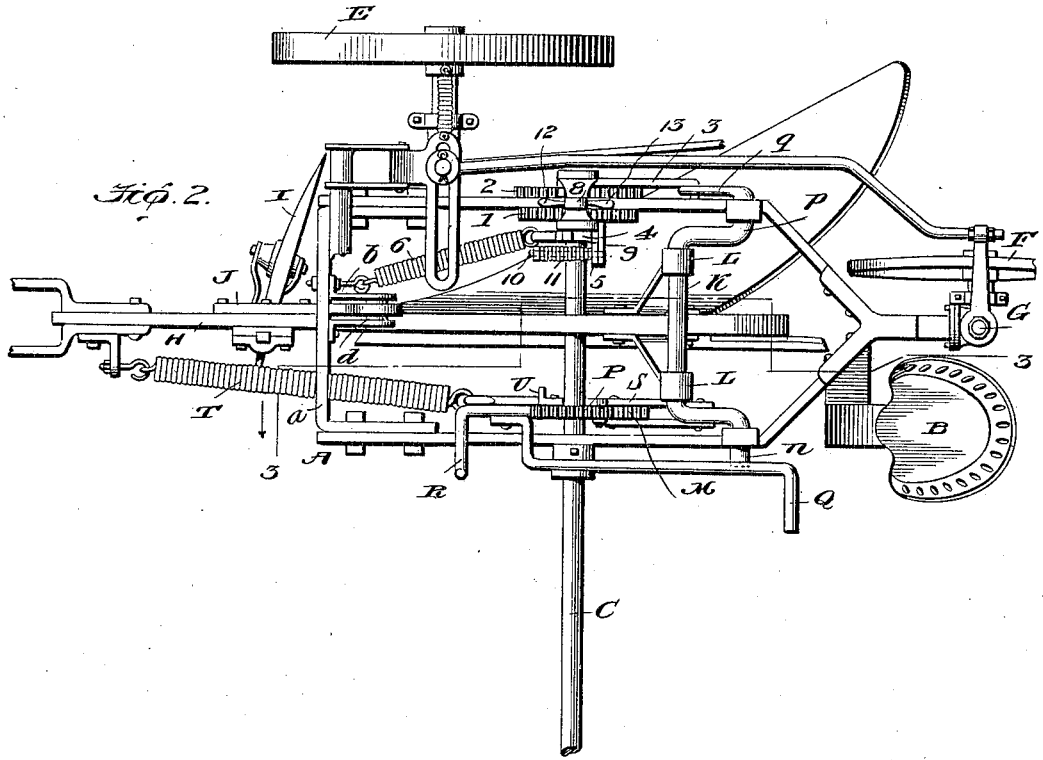
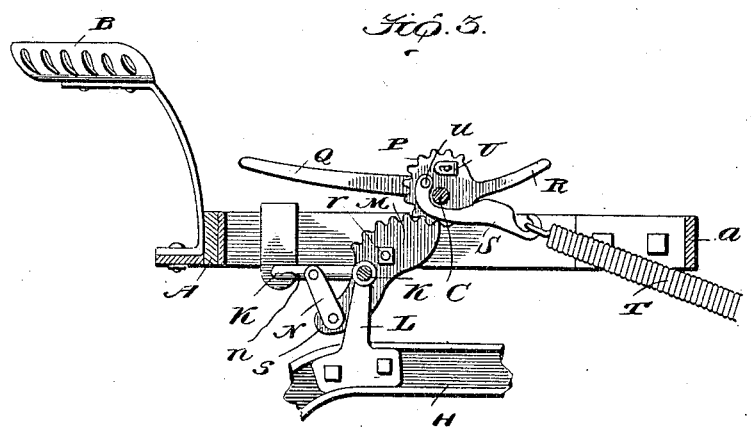
WITNESSES:
INVENTOR.
H. S. Smith.
BY James J. Sheehy
Attorney No. 837,348. PATENTED DEC. 4, 1906.
H. S. SMITH.
WHEELED PLOW.
APPLICATION FILED JUNE 21, 1906.
3 SHEETS—SHEET 3.
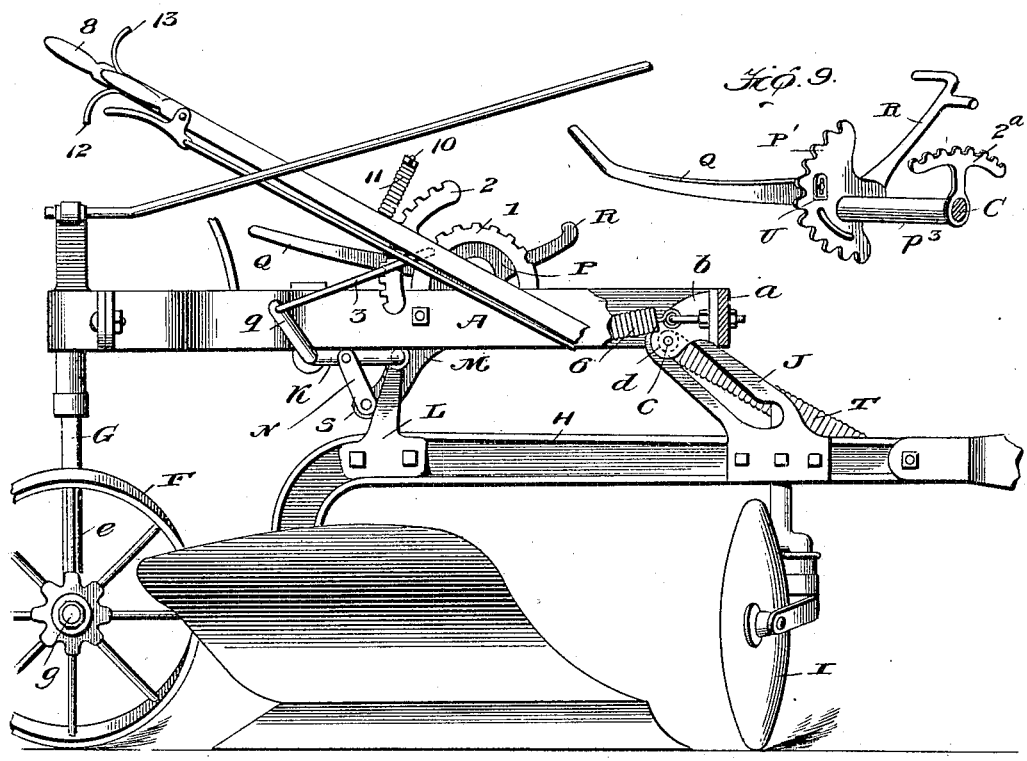
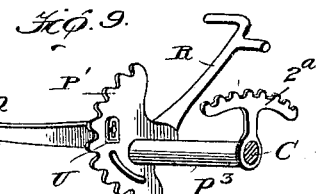
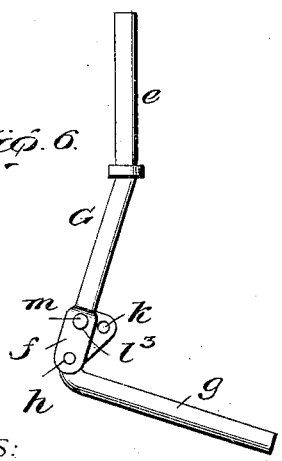
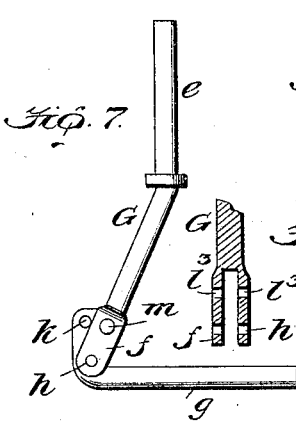
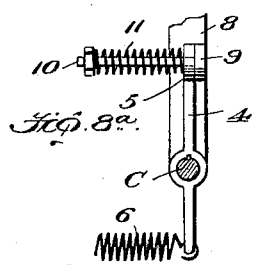
WITNESSES:
INVENTOR
H. S. Smith.
BY James J Sheehy
Attorney

UNITED STATES PATENT OFFICE.

HENRY S. SMITH, OF CHADWICK, ILLINOIS.

WHEELED PLOW.

No. 837,348.  Specification of Letters Patent.  Patented Dec. 4, 1906.

Application filed June 21, 1906. Serial No. 322,715.

*To all whom it may concern:*

Be it known that I, HENRY S. SMITH, a citizen of the United States, residing at Chadwick, in the county of Carroll and State of Illinois, have invented new and useful Improvements in Wheeled Plows, of which the following is a specification.

My invention pertains to wheeled plows of the kind in which the driver is carried by the main frame and is enabled from his seat to raise and lower the plow; and it contemplates the provision of a wheeled plow embodying means whereby when the plow is dropped the point of the plow is caused to move ahead of the heel thereof until the point takes its depth, and then the bail levels the bottom of the plow, thus enabling the plow to draw itself into the ground.

The invention also contemplates the provision in a wheeled plow of means for rendering is easy to lift the plow out of the ground, means for holding the plow down to its work under normal conditions, while, if desired, permitting the plow to rise when it strikes a stick or stone, and means whereby the plow is rendered self-leveling—i. e., the plow may be raised through the medium of a lever and the land-wheel leveled up at the same time.

Other advantageous features of the invention will be fully understood from the following description and claims when the same are read in connection with the accompanying drawings, forming part of this specification, in which—

Figure 1:
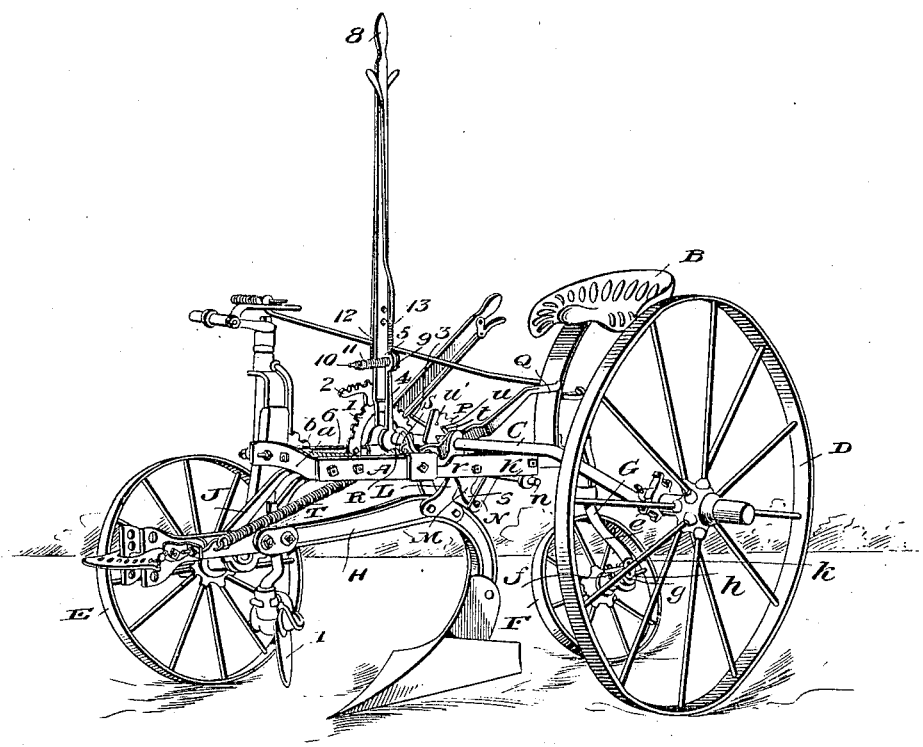
Figure 5:
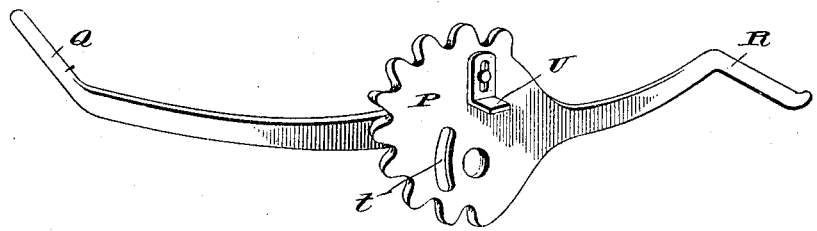

Figure 1 is a perspective view of the wheeled plow constituting the present and preferred embodiment of my invention. Fig. 2 is a top plan view of the same. Fig. 3 is a longitudinal vertical section taken in the plane indicated by the line 3 3 of Fig. 2 looking in the direction indicated by the arrow. Fig. 4 is an elevation of the side of the plow opposite to that shown in Fig. 1 with parts broken away. Fig. 5 is an enlarged detail view of the gear carrying the foot-lever for lifting the plow out of the ground and the foot-lever for unlocking and pushing the plow down. Figs. 6, 7, and 8 are detail views illustrative of the peculiar caster-wheel support. Fig. 8$^a$ is a detail vertical section, on an enlarged scale, of the mechanism for preventing the transmission of shock and jar to the hand-lever. Fig. 9 is a detail view of a modification hereinafter specifically referred to.

Referring by letters and numerals to the drawings, and more particularly to Figs. 1 to 8$^a$ thereof, A is the main frame of the plow. This frame is of the open construction (best shown in Fig. 2) and is provided on its forward cross-bar $a$ with a rearwardly-extending bracket $b$, having a lateral pin $c$, on which is mounted an antifriction-roller $d$, for an important purpose hereinafter described. B is a driver's seat mounted on the rear portion of the main frame. C is an axle journaled in bearings on the main frame and having the usual rearwardly and outwardly extending portion at its end on the left-hand side of the plow. D is a land-wheel mounted on said portion of the axle. E is a furrow-wheel arranged at the opposite side of the main frame with reference to the land-wheel D and shown as connected with said main frame in the ordinary well-known manner, and F is a caster-wheel the support G of which is mounted in the rear portion of the main frame and is connected with the furrow-wheel E as usual. The support G, however, is peculiar in that it comprises an upper section $e$, Figs. 6 and 7, journaled in the main frame and having a bifurcated lower end $f$ and a lower or spindle section $g$, having a head pivoted at $h$ in the bifurcated lower end of the section $e$. The said head of the lower section is provided with two apertures $k$, designed to alternately register with alined apertures $l^3$ in the bifurcated end $f$ and receive a bolt $m$, and hence it will be apparent that the caster-wheel may be positioned at an angle of inclination, Fig. 6, or upright, Fig. 7, to best suit the conditions under which the plow is to operate. H is the plow-beam, which is equipped with the usual colter I. This plow-beam is peculiar in that it has a slotted plate J, fixed to and extending upward and rearward from its forward portion and receiving the antifriction-roller $d$ on the forward portion of the main frame A. K is a vertically-swinging bail arranged between the side bars of the main frame A and having trunnions $n$ and $p$, journaled in bearings depending therefrom, and also having an arm $q$ on its trunnion $p$. L L are hangers fixed to the plow-beam H and pivoted on the transverse portion of the bail K. M is a vertically-swinging segmental gear arranged at the inner side of the left-hand side bar of frame A and connected to said side bar by a bolt $r$ and having a depending arm $s$. N N are links connecting the lower end of said gear-arm s and the side of the bail K and designed to act after the manner of an elbow in raising the plow, and P is a segmental gear loosely mounted on the axle C and having a rearwardly-extending foot-lever Q fixed to it and designed for use in lifting the plow out of the ground and also having a forwardly-extending foot-lever R fixed to it and designed to be used to unlock and push the plow-bottom down. As will be observed, the portion of the gear P nearest the center of movement thereof intermeshes with the portion of the gear M farthest from the center of movement of said gear M, and hence it follows that great leverage is afforded in lifting the plow out of the ground. The gear P is provided in rear of its center of movement with a curvilinear slot $t$, and in this slot $t$ is arranged to move a pin $u$ on a link S. The link S terminates at its forward end in a hook, and this hook is connected by a coiled spring T with the forward portion of the plow-beam H. Consequently it will be apparent that, incident to downward movement of the foot-lever R and as the plow goes down, the pin $u$ will move up in the gear P to a position above the center of movement thereof, with the result that the tension of the spring T will hold the plow down in the ground. At this point it will be noticed that the slot in plate J is so arranged that in dropping the plow the point of the plow moves considerably—say three and one-half inches—ahead of the heel of plow until the point takes its depth, and then the bail K levels the bottom of the plow. This is obviously an important advantage, inasmuch as the plow will draw itself in the ground without pressure being exerted on the foot-lever R. In addition to assisting in locking the plow in the ground the spring T serves to balance the weight of the plow and to assist in lifting the plow when the foot-lever Q is pressed downward. When it is desired to hold the plow unlocked, so that it can rise when it strikes a stone, the stop U is employed. This stop U is connected to the gear P by a bolt passed through a slot in the stop and an aperture in the gear, and it serves the purpose stated by being adjusted to a position in which it prevents the link S moving up past the center of movement of the gear R. 1 is a segmental rack fixed on the right-hand side bar of the main frame A. 2 is a swinging segmental rack loosely mounted on the axle C at the right-hand side of the plow. 3 is a rod connecting said swinging rack 2 with the arm $q$ of bail K. 4 is a lever fixed at an intermediate point of its length on the axle C and having an apertured lug 5 at its upper end. 6 is a spring interposed between and connecting the lower arm of the lever 4 and the forward cross-bar of frame A and having for its office to balance the land-wheel axle C when the plow is in the ground. 8 is a hand-lever loosely mounted on the axle C and having a lateral lug 9, from which extends forward a bolt 10, which rests loose in the apertured lug 5 of lever 4, and 11 is a coiled spring which is mounted on the bolt 10 and is interposed between a nut thereon and the lug 5. This spring 11 acts as a cushion for the land-wheel when the same is traveling on rough ground and prevents the transmission of shock and jar incident thereto to the hand-lever 8, the lever 4 and the lever 8 being connected by the bolt 10 and the spring 11. The lever 8 is provided with detents 12 and 13, the detent 12 being designed to be engaged with the swinging rack 2 when it is desired to use the lever 8 to raise the plow out of the ground, and the detent 13 being designed when the detent 12 is in engagement with the rack 2 to be placed in engagement with the rack 1 to level the land-wheel D. From this it follows that the plow is self-leveling—that is to say, the driver can raise the plow through the medium of the lever 8 and level up the land-wheel D at the same time.

In the modified construction (shown in Fig. 8) the segmental gear P', corresponding to the gear P of Figs. 1 to 6, is fixedly connected, through a sleeve $p^3$, with the swinging rack $2^a$, corresponding to the rack 2 of Figs. 1 to 6. The sleeve $p^3$ is loosely mounted on the axle C between the side bars of the main frame A, and hence it will be apparent that when the hand-lever 8 is made fast to the rack $2^a$ through the medium of the detent 12 the plow may be raised out of the ground through the medium of the said hand-lever.

It will be gathered from the foregoing that the construction shown in Fig. 8 is a simplification of the construction in Figs. 1 to 6 for the same purpose, inasmuch as it obviates the necessity of providing an arm $q$ on the bail and a rod 3 intermediate said arm and the swinging rack.

I have entered into a detailed description of the construction and relative arrangement of the parts embraced in the present and preferred embodiment of my invention in order to impart a full, clear, and exact understanding of the same. I do not desire, however, to be understood as confining myself to the said specific construction and relative arrangement of parts, as such changes or modifications may be made in practice as fairly fall within the scope of my invention as claimed.

Having described my invention, what I claim, and desire to secure by Letters Patent, is—

1. In a wheeled plow, the combination of a main frame, a vertically-swinging bail, a plow-beam connected to the bail, a gear mounted on the main frame and having an arm, a link connection intermediate said arm and the bail, and a second gear intermeshed with the first-mentioned gear and having a lever.

2. In a wheeled plow, the combination of a main frame, a vertically-swinging bail mounted therein, a plow-beam connected to the bail, a gear mounted on the main frame and connected with the bail, and a second gear intermeshed with the first-mentioned gear; the teeth of the second-mentioned gear nearest the center of movement thereof being intermeshed with the teeth of the first-mentioned gear farthest from the center of movement of the latter gear.

3. In a wheeled plow, the combination of a main frame, a vertically-swinging bail mounted therein, a plow-beam connected with the bail, a gear mounted on the main frame and having a depending arm, a link connection intermediate said arm and the bail, and a second gear intermeshed with the first-mentioned gear and having forwardly and rearwardly extending levers; the teeth of the second-mentioned gear nearest the center of movement thereof engaging the teeth of the first-mentioned gear farthest from the center of movement of the latter gear.

4. In a wheeled plow, the combination of a main frame, a vertically-swinging bail, a plow-beam connected to the bail, a gear mounted on the main frame and having an arm, a link connection intermediate said arm and the bail, a second gear intermeshed with the first-mentioned gear and having one or more levers and also having a curvilinear slot, a link having a projection movable in said slot of the gear, and a spring connecting said link and the forward portion of the plow-beam.

5. In a wheeled plow, the combination of a main frame, a vertically-swinging bail mounted therein, a plow-beam connected with the bail, a gear mounted on the main frame and having a depending arm, a link connection intermediate said arm and the bail, a second gear having the teeth nearest its center of movement intermeshed with the teeth of the first-mentioned gear farthest from the center of movement thereof and also having a lever and a curvilinear slot, a link having a projection movable in said slot of the gear, and a spring connecting said link and the forward portion of the plow-beam.

6. In a wheeled plow, the combination of a main frame, a vertically-swinging bail mounted therein, a plow-beam connected to the bail, a gear mounted in the main frame and having an arm connected with the bail, a second gear intermeshed with the first-mentioned gear and having a lever and also having a curvilinear slot, a link having a projection movable in the said slot of the gear, a spring connecting said link and the forward portion of the plow-beam, and a plate fixed to the forward portion of the plow-beam and having a slot receiving a projection on the main frame.

7. In a wheeled plow, the combination of a main frame, a vertically-swinging bail mounted therein, a plow-beam connected to the bail, a gear mounted in the main frame and having an arm connected with the bail, a second gear having a curvilinear slot and also having the teeth nearest its center of movement intermeshed with the teeth farthest from the center of movement of the first-mentioned gear, a link having a projection movable in the said slot of the gear, a spring connecting said link and the forward portion of the plow-beam, and a plate fixed to the forward portion of the plow-beam and having a slot receiving a projection on the main frame.

8. In a wheeled plow, the combination of a main frame, a vertically-swinging bail, a plow-beam connected to the bail, a gear mounted on the main frame and having an arm connected with the bail, a second gear intermeshed with the first-mentioned gear and having a lever and also having a curvilinear slot, a stop adjustably connected to said gear, a link having a projection movable in said slot of the gear, and a spring connecting said link and the forward portion of the plow-beam.

9. In a wheeled plow, the combination of a main frame having a projection on its forward portion, a plow-beam, a plate fixed to the forward portion of the beam and having the inclined slot receiving the projection on the main frame, and a connection between the plow-beam and the main frame for raising said beam.

10. In a wheeled plow, the combination of a main frame, a land-wheel, an axle journaled on the main frame and carrying the land-wheel, a vertically-swinging bail mounted in the main frame, a plow-beam connected to said bail, a hand-lever connected with the axle, means for adjustably fixing said hand-lever with respect to the main frame, a swinging rack connected with the bail, and means for fixing the hand-lever to said rack.

11. In a wheeled plow, the combination of a main frame, a land-wheel, an axle journaled on the main frame and carrying the land-wheel, a vertically-swinging bail mounted in the main frame, a plow-beam connected to said bail, a gear mounted in the main frame and connected with the bail, a gear mounted on the axle and intermeshed with the first-mentioned gear and having foot-levers, a lever fixed on the axle and extending above and below the same, a spring connecting the lower portion of said lever and the forward portion of the main frame, a hand-lever yieldingly connected with said lever fixed on the axle, means for adjustably fixing said hand-lever with respect to the main frame, a swinging rack connected with the bail, and means for fixing the hand-lever to said rack.

12. In a wheeled plow, the combination of a main frame, a land-wheel, an axle journaled on the main frame, and carrying the landwheel, a vertically-swinging bail mounted in the main frame, a plow-beam connected to said bail, a hand-lever connected with the axle, means for adjustably fixing said hand-lever with respect to the main frame, a swinging rack, a gear mounted on the axle and intermeshed with the first-mentioned gear and having a foot-lever, a sleeve mounted on the axle and fixing together the second-mentioned gear and the swinging rack, and means for fixing the hand-lever to the swinging rack.

13. In a wheeled plow, the combination of a main frame, an axle, a land-wheel carried thereby, a plow-beam, a bail mounted in the frame and connected with the beam, a gear mounted on the axle and having a foot-lever, a connection between said gear and the bail, a swinging rack, a sleeve mounted on the axle and fixedly connecting together said gear and rack, a hand-lever, and means for fixing said hand-lever to the swinging rack.

14. In a wheeled plow, the combination of a main frame, an axle, a land-wheel carried by the axle, a plow-beam, a bail mounted in the frame and connected with the beam and having an arm $q$, a swinging rack, a connection intermediate said arm $q$ and the swinging rack, a gear connected with the bail and having a foot-lever, a hand-lever, and means for fixing said hand-lever to the swinging rack.

In testimony whereof I have hereunto set my hand in presence of two subscribing witnesses.

HENRY S. SMITH.

Witnesses:
  DANIEL H. CURLEY,
  FRANK W. ZUGSCHWERDT.